US012657857B2

(12) United States Patent
Hashimoto

(10) Patent No.: US 12,657,857 B2
(45) Date of Patent: Jun. 16, 2026

(54) ILLUMINATION ADJUSTING DEVICE, ILLUMINATION ADJUSTING METHOD, AND PRODUCT RECOGNITION SYSTEM

(71) Applicant: Panasonic Intellectual Property Management Co., Ltd., Osaka (JP)

(72) Inventor: Kiyoshi Hashimoto, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 312 days.

(21) Appl. No.: 18/561,629

(22) PCT Filed: Apr. 19, 2022

(86) PCT No.: PCT/JP2022/018180
§ 371 (c)(1),
(2) Date: Nov. 16, 2023

(87) PCT Pub. No.: WO2022/244577
PCT Pub. Date: Nov. 24, 2022

(65) Prior Publication Data
US 2024/0249490 A1      Jul. 25, 2024

(30) Foreign Application Priority Data

May 21, 2021      (JP) ................................. 2021-086135

(51) Int. Cl.
*G06V 10/141* (2022.01)
*G06T 7/00* (2017.01)
(Continued)

(52) U.S. Cl.
CPC .......... *G06V 10/141* (2022.01); *G06T 7/0002* (2013.01); *G06T 7/13* (2017.01);
(Continued)

(58) Field of Classification Search
CPC ...... G06V 10/141; G06V 10/44; G06V 10/60; G06V 10/764; G06V 20/50; G06T 7/0002;
(Continued)

(56) References Cited

U.S. PATENT DOCUMENTS

2016/0345400 A1* 11/2016 Shih ....................... H04N 23/56
2022/0092866 A1 3/2022 Inoue

FOREIGN PATENT DOCUMENTS

JP          2001-145018          5/2001
JP          2005-024971          1/2005
(Continued)

OTHER PUBLICATIONS

Im, Jonghoon, et al. "Correction of Over and Under Exposure Images Using Multiple Lighting System." Proceedings of the 2nd International Conference on Maintenance Science and Technology (ICMST2014). 2015. (Year: 2015).*

(Continued)

*Primary Examiner* — Jonathan S Lee
(74) *Attorney, Agent, or Firm* — Greenblum & Bernstein, P.L.C.

(57) ABSTRACT
An illumination adjustment apparatus comprises: a recognizer that recognizes an abnormal region in a captured image; and an adjuster that adjusts an intensity of illuminating light in accordance with a shape and a type of the abnormal region.

11 Claims, 9 Drawing Sheets

(51) Int. Cl.

| | |
|---|---|
| *G06T 7/13* | (2017.01) |
| *G06V 10/44* | (2022.01) |
| *G06V 10/60* | (2022.01) |
| *G06V 10/764* | (2022.01) |
| *G06V 20/50* | (2022.01) |

(52) U.S. Cl.
CPC .............. *G06V 10/44* (2022.01); *G06V 10/60* (2022.01); *G06V 10/764* (2022.01); *G06V 20/50* (2022.01); *G06T 2207/10152* (2013.01); *G06T 2207/20021* (2013.01); *G06T 2207/20081* (2013.01)

(58) Field of Classification Search
CPC ............. G06T 7/13; G06T 2207/10152; G06T 2207/20021; G06T 2207/20081
USPC ........................................................ 382/174
See application file for complete search history.

(56) References Cited

FOREIGN PATENT DOCUMENTS

| | | |
|---|---|---|
| JP | 2011-220755 | 11/2011 |
| JP | 2014-160013 | 9/2014 |
| JP | 2018-085068 | 5/2018 |
| WO | 2020/116170 | 6/2020 |

OTHER PUBLICATIONS

Extended European Search Report Issued in Corresponding EP Patent Application No. 22804491.3, dated Aug. 20, 2024.
International Search Report issued in International Pat. Appl. No. PCT/JP2022/018180, dated Jun. 28, 2022, along with an English translation thereof.

* cited by examiner

300

306'

307'

ILLUMINATION ADJUSTING DEVICE, ILLUMINATION ADJUSTING METHOD, AND PRODUCT RECOGNITION SYSTEM

TECHNICAL FIELD

The present disclosure relates to an illumination adjustment apparatus, an illumination adjustment method, and a product recognition system.

BACKGROUND ART

More and more retail stores such as convenience stores and supermarkets have introduced so-called self-checkout terminals in order to shorten the waiting time at cash registers. Some of the self-checkout terminals perform image processing on a captured image captured by using an image-capturing means such as a camera to recognize a product placed on a checkout table (product placement site) by a user such as a customer.

When the product is recognized by performing the image processing in this way, variation in illumination around the self-checkout terminals has a large influence on the product recognition accuracy.

For example, Patent Literature (hereinafter, referred to as "PTL") 1 discloses a technique of uniformly illuminating an entire predetermined area including an object (product) such that the shadow of the imaged object in a captured image does not occur or is reduced when the shadow of the imaged object is to appear in the captured image, in order to enhance the product recognition accuracy.

CITATION LIST

Patent Literature

PTL 1
Japanese Patent Application Laid-Open No. 2018-085068

SUMMARY OF INVENTION

However, in the technique described in PTL 1, a dynamic or local abnormal region such as a blown-out highlight caused by reflection of illumination or an unexpected appearance of a shadow of a user may occur in a captured image. This may adversely affect the product recognition accuracy.

One non-limiting and exemplary embodiment facilitates providing an illumination adjustment apparatus, an illumination adjustment method, and a product recognition system capable of stabilizing product recognition accuracy.

An illumination adjustment apparatus according to one exemplary embodiment of the present disclosure includes: a recognizer that recognizes an abnormal region in a captured image; and an adjuster that adjusts an intensity of illuminating light in accordance with a shape and a type of the abnormal region.

An illumination adjustment method according to one exemplary embodiment of the present disclosure includes: recognizing an abnormal region in a captured image: and adjusting an intensity of illuminating light in accordance with a shape and a type of the abnormal region.

A product recognition system according to one exemplary embodiment of the present disclosure includes: an illuminator that emits illuminating light to a predetermined region on which a product is placed: an acquirer that captures and acquires an image of the predetermined region to which the illuminating light is emitted; and an illumination adjustment apparatus that recognizes an abnormal region in the captured and acquired image and adjusts an intensity of the illuminating light in accordance with a shape and type of the abnormal region, in which the acquirer re-captures and re-acquires the image of the predetermined region to which the illuminator emits or does not emit the illuminating light at the intensity adjusted, and the illumination adjustment apparatus recognizes the product in the re-captured and re-acquired image.

Note that these general or specific aspects may be realized by a system, an apparatus, a method, an integrated circuit, a computer program, or a recording medium, and may be realized by any combination of a system, an apparatus, a method, an integrated circuit, a computer program, and a recording medium.

According to one exemplary embodiment of the present disclosure, since the illuminating light can be adjusted in accordance with the shape of the abnormal region in the captured image of the predetermined region on which the product is placed, it is possible to stabilize the product recognition accuracy.

Additional benefits and advantages of the disclosed embodiments will become apparent from the specification and drawings. The benefits and/or advantages may be individually acquired by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with reference to the drawings as appropriate. However, any unnecessarily detailed description may be omitted. For example, detailed descriptions of already well-known matters and repeated descriptions for substantially the same configuration may be omitted. This is to avoid the unnecessary redundancy of the following description and to facilitate understanding of those skilled in the art.

Note that, the accompanying drawings and the following description are provided so that a person skilled in the art understands the present embodiment sufficiently, and are not intended to limit the subject matters recited in the claims.

Embodiment 1

<Configuration of Product Recognition System>

Figure 1:
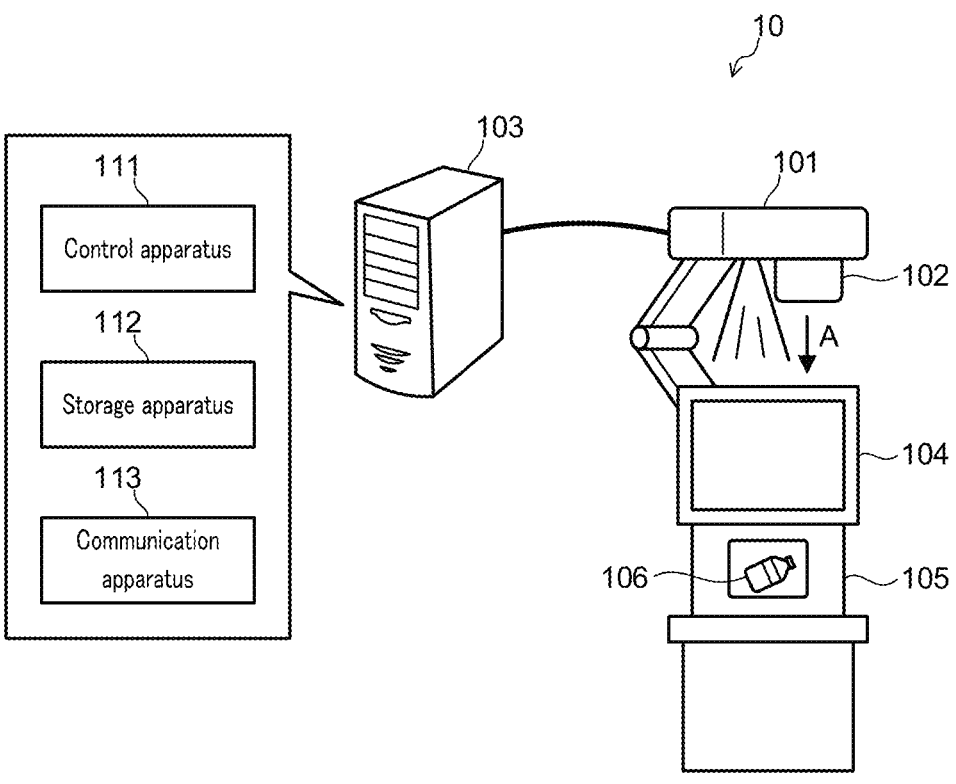
FIG. 1 is a block diagram illustrating an example of a product recognition system according to Embodiment 1 of the present disclosure.
Figure 2:
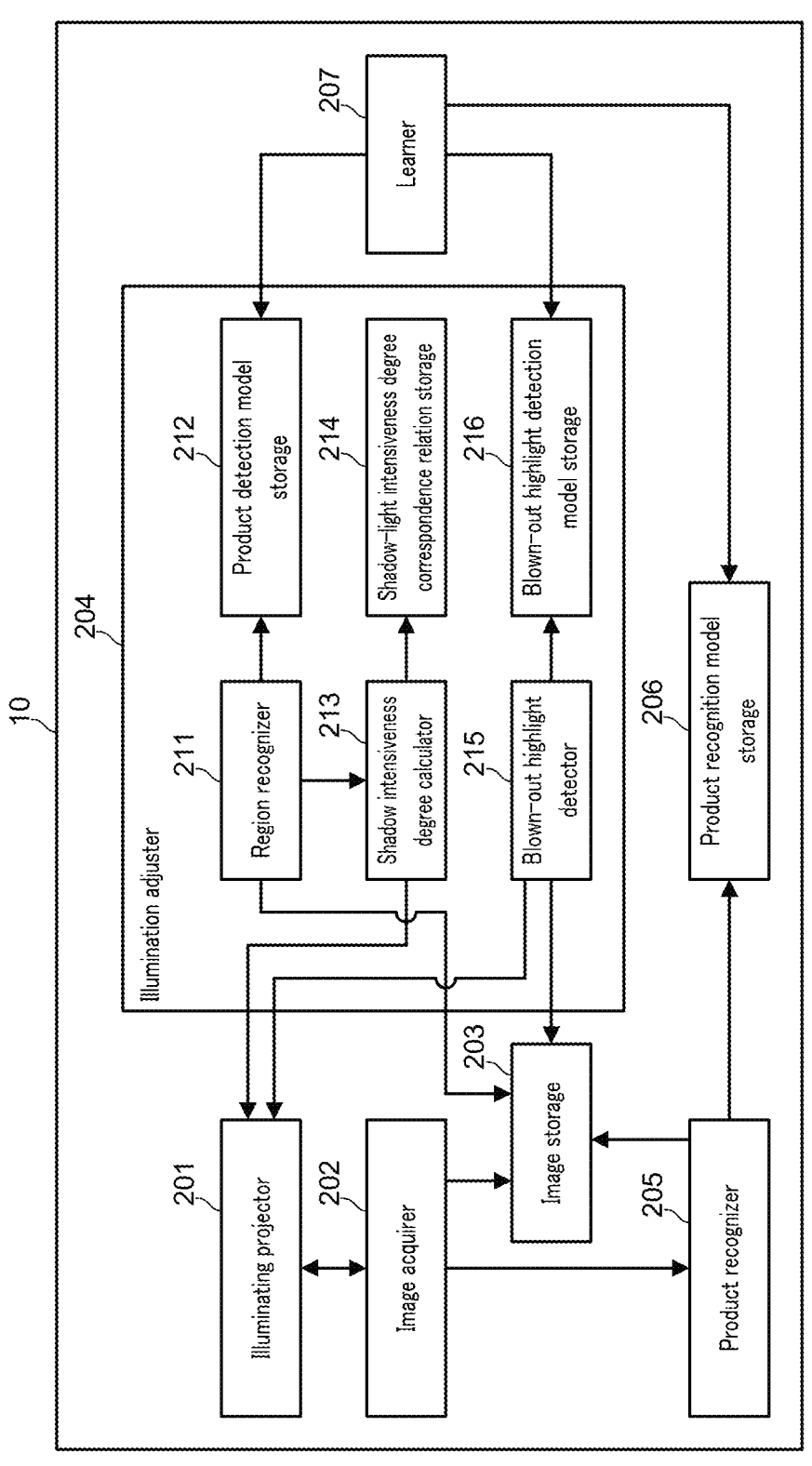
FIG. 2 is a functional block diagram illustrating an example of the product recognition system according to Embodiment 1 of the present disclosure.

Referring to FIGS. 1 and 2, product recognition system 10 according to Embodiment 1 of the present disclosure will be described.

FIG. 1 is a block diagram illustrating an example of product recognition system 10 according to Embodiment 1.

Product recognition system 10 includes illumination apparatus 101, image-capturing apparatus 102, information processing apparatus 103, display apparatus 104, and product placement site 105.

Illumination apparatus 101 may be, for example, a projector. Under the control of information processing apparatus 103 (more specifically, control apparatus 111 to be described later), illumination apparatus 101 emits light (illuminating light) to a placement surface (predetermined region) of product placement site 105 on which an object such as e.g., product 106 is placed, as indicated by arrow A.

Illumination apparatus 101 as a projector can locally control the emission light to the placement surface of product placement site 105. Specifically, illumination apparatus 101, which is a projector, recognizes the distance (height) between the illumination apparatus and the placement surface of product placement site 105 in advance, and controls the amount of light partially (locally), thereby controlling the intensity (also referred to as intensiveness degree) of the emission light emitted by illumination apparatus 101 and the shape or pattern (distribution of the brightness of the light on the placement surface of product placement site 105).

Here, the intensity of the emission light emitted by illumination apparatus 101 may be a preset stepwise amount of light, and may be, for example, grade 0 (light is off (light amount is zero)), grade 1 (default intensity), grade 2 higher than grade 1, grade 3 higher than grade 2, grade 4 higher than grade 3, and grade 5 higher than grade 4. Note that the intensity of the emission light emitted by illumination apparatus 101 substantially means the stepwise brightness of the light on the placement surface of product placement site 105.

Image-capturing apparatus 102 may be an image-capturing element (camera) such as e.g., a Charge-Coupled Device (CCD). Under the control of information processing apparatus 103, image-capturing apparatus 102 captures an image of an object or the like placed on the placement surface of product placement site 105, and generates and acquires a two-dimensional color or monochrome captured image including an image of the object.

Information processing apparatus 103 may be, for example, a computer (calculator). Information processing apparatus 103 includes control apparatus 111 such as a Central Processing Unit (CPU), storage apparatus 112 such as a memory or a hard disk, and communication apparatus 113 such as a network interface card. Although not illustrated, information processing apparatus 103 may include an input/output apparatus generally included in a computer.

Information processing apparatus 103 controls the operations of illumination apparatus 101, image-capturing apparatus 102, and display apparatus 104 connected by wire or wirelessly via communication apparatus 113.

Display apparatus 104 may be, for example, a touch panel or a Liquid Crystal Display (LCD). Display apparatus 104 displays information (a checkout button, details of a purchased product, a total checkout amount, and the like) to a user under the control of information processing apparatus 103. Display apparatus 104 may include an input apparatus, and may receive an operation by the user as necessary.

A product purchased by the user is placed on product placement site 105 to be recognized. A simple colored material such as a white plate is used as the placement surface of product placement site 105 so as to facilitate distinction between the product and the placement surface. An enclosure may be provided on a side surface and an upper portion of product placement site 105. With this enclosure, the emission light of illumination apparatus 101 may be emitted to the placement surface of product placement site 105 from the upper portion while an influence of the ambient light is reduced by this enclosure.

Information processing apparatus 103 (in particular, illumination adjuster 204 to be described later) is an example of the illumination adjustment apparatus according to the present disclosure.

The positional relation between illumination apparatus 101 and image-capturing apparatus 102 is not particularly limited as long as it is ensured that the emission light of illumination apparatus 101 does not cause any shadow of the user standing in front of product placement site 105 to appear in the captured image acquired by image-capturing apparatus 102.

In Embodiment 1, a self-checkout terminal may be realized by integrally configuring one information processing apparatus 103, one illumination apparatus 101, one image-capturing apparatus 102, and one display apparatus 104. Alternatively, one information processing apparatus 103 may be configured to control the operations of multiple sets of illumination apparatus 101, image-capturing apparatus 102, and display apparatus 104.

FIG. 2 is a functional block diagram illustrating an example of product recognition system 10 according to Embodiment 1.

Product recognition system 10 includes illuminating projector 201, image acquirer 202, image storage 203, illumination adjuster 204, product recognizer 205, product recognition model storage 206, and learner 207.

Illuminating projector 201 corresponds to, for example, illumination apparatus 101 illustrated in FIG. 1. Illuminating projector 201 emits illuminating light to the placement surface of product placement site 105. Illuminating projector 201 firstly emits the illuminating light with a default intensity of grade 1 described above. In addition, as will be described below, illuminating projector 201 emits or does not emit the illuminating light of an adjusted light intensity in accordance with the shape and the type of an abnormal region to be described later, as necessary. In Embodiment 1, it is assumed that illuminating projector 201 emits light in accordance with the distance to the placement surface of product placement site 105, that is, emits light so as to achieve a desired brightness at the placement surface of product placement site 105.

Image acquirer 202 corresponds to, for example, image-capturing apparatus 102 illustrated in FIG. 1. Image acquirer 202 captures an image of an object or the like placed on the placement surface of product placement site 105 to generate and acquire a captured image. Then, image acquirer 202 stores the acquired captured image in image storage 203.

The coordinate system of the placement surface of product placement site 105, and therefore, the position coordinate information on the captured image is shared between illuminating projector 201 and image acquirer 202.

Illumination adjuster 204 determines and adjusts the emission light (for example, the intensity and the shape of the emission light) of illuminating projector 201 in accordance with the shape and the type of an abnormal region based on at least one of a shadow region and a blown-out highlight region (the shadow region and the blown-out highlight region are collectively referred to as "abnormal region": that is, the shadow region and the blown-out highlight region are included as the types of the abnormal region) in the captured image acquired by image acquirer 202. Here, the "shadow region" refers to a dark region in the captured image caused as a result of an object, a person, or the like blocking the travel of light, and the "blown-out highlight region" refers to a region in which a blown-out highlight occurs in the captured image, that is, a region in which the gradation of the bright portion is lost and becomes white. Note that, the blown-out highlight is caused, for example, when the brightness exceeds the upper limit of a dynamic range of a light-receiving element, the light-receiving element cannot recognize the gradation of the brightness.

Illumination adjuster 204 includes region recognizer 211, product detection model storage 212, shadow intensiveness degree calculator 213, shadow-light intensiveness degree correspondence relation storage 214, blown-out highlight detector 215, and blown-out highlight detection model storage 216.

Region recognizer 211 recognizes a product region in the captured image stored in image storage 203 on a pixel basis based on edge detection and a product detection model trained by learner 207 and stored in product detection model storage 212. The edge detection is used to detect the outline of a product and to recognize the product region on a pixel basis. Region recognizer 211 recognizes the product region by combining the product detection model and the edge detection in order to more accurately determine whether the detected edge is an edge of the product or an edge of a noise (for example, a hand of a user).

Region recognizer 211 also recognizes the shadow region in the captured image stored in image storage 203 based on the recognized product region and the background subtraction method. Specifically, in order to recognize the shadow region, region recognizer 211 first calculates a difference in luminance between the captured image (background image) before a product is placed and the captured image after the product is placed which images are stored, for example, in storage apparatus 112, and detects the shadow region and the product region. Next, region recognizer 211 recognizes the shadow region by excluding, from the detected shadow region and the product region, the product region recognized by the above-described product detection. Then, region recognizer 211 outputs, to shadow intensiveness degree calculator 213, the position coordinate information on the recognized shadow region and a difference value of the shadow region between the captured images before and after placing the product. In the present embodiment, it is assumed that the shadow region which temporarily covers a part of the product when the product is placed, such as a shadow of a person performing checkout, is recognized. Therefore, in the present embodiment, the image captured in a state where an object causing a shadow (the person performing checkout in the above-described example) does not exist is used as the background image. Further, by using the image captured in a real environment before a product is placed, the background image in which the luminance corresponding to the ambient light or the like in the real environment is reflected can be acquired. Thus, the shadow region and the product region can be accurately detected.

Shadow intensiveness degree calculator 213 calculates the shadow intensiveness degree of the shadow region based on the difference value of the shadow region between the captured images before and after placing the product that are inputted by region recognizer 211. The shadow intensiveness degree is a value indicating the shadow density. Specifically, shadow intensiveness degree calculator 213 calculates, as the shadow intensiveness degree of the shadow region, the average value of absolute values of difference values for the respective pixels of the shadow region between the background image and the captured image after the product is placed.

Next, based on the calculated shadow intensiveness degree, shadow intensiveness degree calculator 213 determines the intensity of light to be emitted by illuminating projector 201 in accordance with the shape of the shadow region. Specifically, shadow intensiveness degree calculator 213 refers to shadow-light intensiveness degree correspondence relation data stored in shadow-light intensiveness degree correspondence relation storage 214, and determines the intensity of the light to be emitted by illuminating projector 201 in accordance with the shape of the shadow region.

Here, the shadow-light intensiveness degree correspondence relation data is data indicating a correspondence relation between the shadow intensiveness degree of the shadow region and the intensity of the light to be emitted by illuminating projector 201 in accordance with the shape of the shadow region. For example, the shadow intensiveness degree of 50 or more and less than 60 may be associated with the intensity of the light of above-described grade 2, the shadow intensiveness degree equal to or higher than 60 and lower than 70 may be associated with the intensity of the light of above-described grade 3, the shadow intensiveness degree equal to or higher than 70 and lower than 80 may be associated with the intensity of the light of above-described grade 4, and the shadow intensiveness degree equal to or higher than 80 may be associated with the intensity of the light of above-described grade 5. Note that the correspondence relation between the shadow intensiveness degree and the intensity of light may be determined by confirming, through experiments, such a correspondence relation as that reducing the influence on the recognition accuracy. In addition, association between the shadow intensiveness degree and the light intensity may be made in finer units, for example, in a one-to-one manner.

Then, shadow intensiveness degree calculator 213 outputs, to illuminating projector 201, the position coordinate information on the shadow region inputted by region recognizer 211 and the determined intensity of the light. That is, shadow intensiveness degree calculator 213 adjusts illuminating projector 201 such that the illuminating projector emits light with an intensity determined for a part of the placement surface of product placement site 105 corresponding to the shadow region.

When the shadow is generated in the captured image as described above, the shadow intensiveness degree of the shadow region is reduced by making the light emitted to the part corresponding to the shadow region of the placement surface of product placement site 105 more intense (brighter) than the default intensity. As a result, the product recognition accuracy can be stabilized.

Blown-out highlight detector 215 recognizes a blown-out highlight region in the captured image stored in image storage 203 based on a blown-out highlight detection model trained by learner 207 and stored in blown-out highlight detection model storage 216. Next, blown-out highlight detector 215 determines not to emit light to the part of the placement surface of product placement site 105 corresponding to the blown-out highlight region, that is, to set the intensity of the light to above-described grade 0 (off).

Then, blown-out highlight detector 215 outputs the position coordinate information on the blown-out highlight region and the determined light intensity (grade 0) to illuminating projector 201. That is, blown-out highlight detector 215 performs adjustment such that illuminating projector 201 does not emit light to the part of the placement surface of product placement site 105 corresponding to the blown-out highlight region.

It is desirable that the recognition of the blown-out highlight region by blown-out highlight detector 215 is performed after the emission light adjustment based on the shadow intensiveness degree by shadow intensiveness degree calculator 213. This is because there is a possibility that a new blown-out highlight occurs as a result of the emission light adjustment based on the shadow intensiveness degree by shadow intensiveness degree calculator 213, that is, as a result of the emission light becoming brighter.

In this way, when a blown-out highlight has occurred in the captured image, the reflection that is the cause of the blown-out highlight is suppressed by turning off the light to be emitted to the part corresponding to the blown-out highlight region of the placement surface of product placement site 105. As a result, the product recognition accuracy can be stabilized.

Product recognizer 205 recognizes the product in the captured image stored in image storage 203 based on a product recognition model trained by learner 207 and stored in product recognition model storage 206.

Learner 207 attaches a label "product" to an image of a product placed on the placement surface of product placement site 105 at a various angle, which image is captured, generated, and acquired in advance by image acquirer 202, and learner 207 stores the image in product detection model storage 212 as training data. Learner 207 also generates (trains) a product detection model using the training data, and stores the generated product detection model in product detection model storage 212. The product detection model is used to detect that an object placed on the placement surface of product placement site 105 is a product.

Learner 207 attaches a label "blown-out highlight" to an image of a blown-out highlight included in an image of a product placed on the placement surface of product placement site 105 at a various angle that is captured, generated, and acquired in advance by image acquirer 202, and learner 207 stores the image as training data in blown-out highlight detection model storage 216. Learner 207 also generates (trains) a blown-out highlight detection model using the training data, and stores the generated blown-out highlight detection model in blown-out highlight detection model storage 216. The blown-out highlight detection model is used to detect the presence of a blown-out highlight in a captured image.

Learner 207 attaches a label of product identification information such as a product name and a product code to an image of a product placed on the placement surface of product placement site 105 at a various angle that is captured, generated, and acquired in advance by image acquirer 202, and learner 207 stores the image as training data in product recognition model storage 206. Learner 207 also generates (trains) a product recognition model using the training data, and stores the generated product recognition model in product recognition model storage 206. The product recognition model is used to classify which product the object placed on the placement surface of product placement site 105 is. Note that the image of the product used for generating the product recognition model may be the same as the image of the product used for generating the product detection model.

Illuminating projector 201 is one example of the illuminator according to the present disclosure. Image acquirer 202 is one example of the acquirer according to the present disclosure. Region recognizer 211 and blown-out highlight detector 215 are one example of the recognizer according to the present disclosure. Shadow intensiveness degree calculator 213 and blown-out highlight detector 215 are one example of the adjuster according to the present disclosure.

Region recognizer 211, shadow intensiveness degree calculator 213, blown-out highlight detector 215, product recognizer 205, and learner 207 may be, for example, software modules realized by control apparatus 111 of information processing apparatus 103 executing a program stored in storage apparatus 112 of information processing apparatus 103 illustrated in FIG. 1.

Such a program may exist in a server external to information processing apparatus 103, or may be executed by control apparatus 111 via the network via communication apparatus 113 of information processing apparatus 103. Such a program may be stored (recorded) in a storage (recording) medium such as a CD-ROM or a DVD in addition to a storage apparatus such as a memory or a hard disk.

Image storage 203, product detection model storage 212, shadow-light intensiveness degree correspondence relation storage 214, blown-out highlight detection model storage 216, and product recognition model storage 206 may be, for example, a storage region formed in storage apparatus 112 of information processing apparatus 103 by control apparatus 111 of information processing apparatus 103 executing the above-described program.

Figure 3:
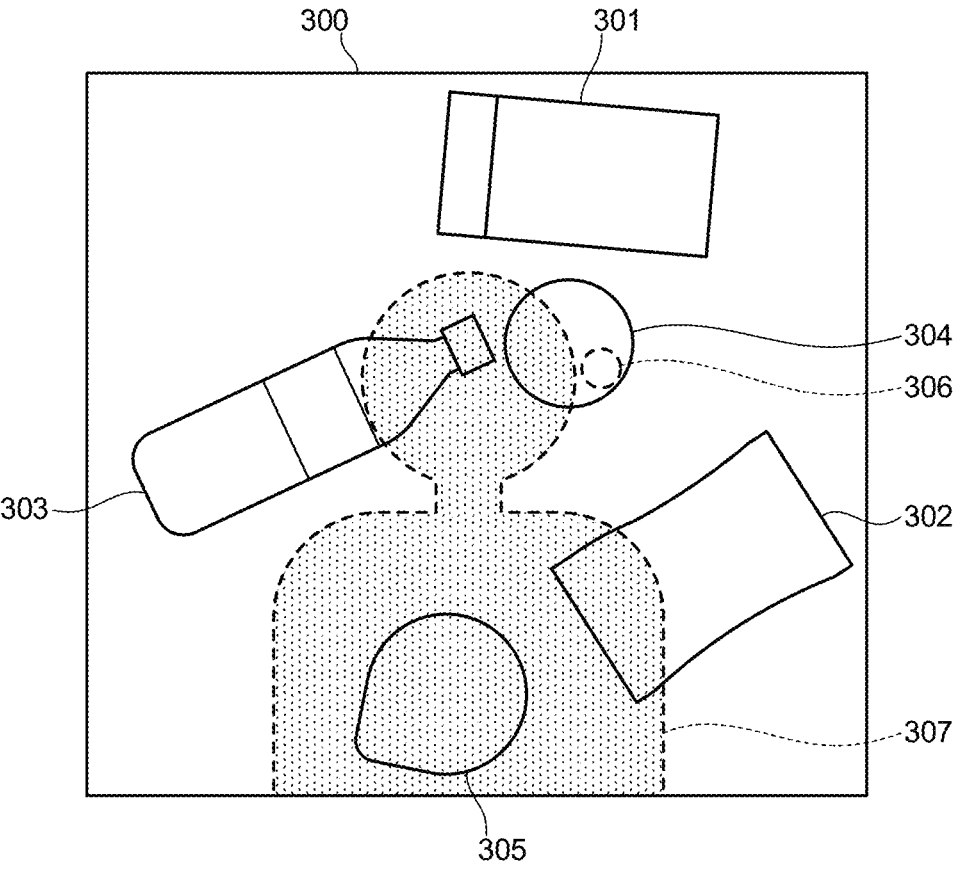
FIG. 3 is a diagram illustrating an example of a captured image acquired by capturing an image of objects (products) placed on a placement surface of a product placement site using default emission light.

FIG. 3 is a diagram illustrating an example of captured image 300 acquired by capturing, using default emission light, objects (products) placed on the placement surface of product placement site 105. Here, the default emission light may be light emitted onto the placement surface of product placement site 105 with the intensity of above-described grade 1.

In captured image 300, there are products 301 to 305, blown-out highlight 306, and shadow 307. Blown-out highlight 306 is caused by reflection due to introduced illumination. Shadow 307 is caused by the shadow of the user introduced. As described above, in a process of recognizing a product by the product recognition system, a blown-out highlight or a shadow may dynamically or locally occur in a captured image.

Figure 4:
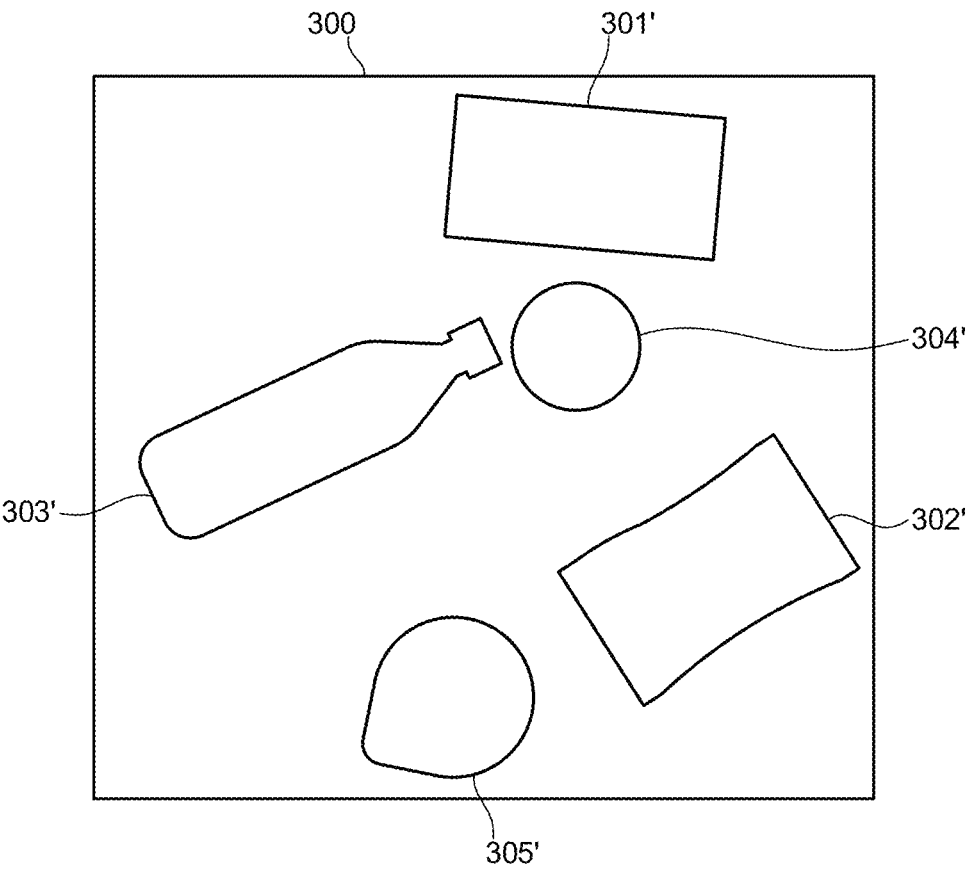
FIG. 4 is a diagram for explaining recognition of a product region in the captured image illustrated in FIG. 3.

FIG. 4 is a diagram for explaining recognition of a product region in captured image 300 illustrated in FIG. 3.

Region recognizer 211 recognizes product regions 301' to 305' in captured image 300 based on the product detection model stored in product detection model storage 212 and the edge detection. Since a simple color material such as a white plate is used for the placement surface of product placement site 105, the background in captured image 300 is a simple background, and the product detection is single class recognition of whether or not the product is a product, which is a simple task compared to product classification. Therefore, regarding product detection, recognition robust to illumination fluctuation is possible. Further, region recognizer 211 detects the outline of each of the products by edge detection, recognizes the product region on a pixel basis, and acquires position coordinate information on the product region.

Figure 5:
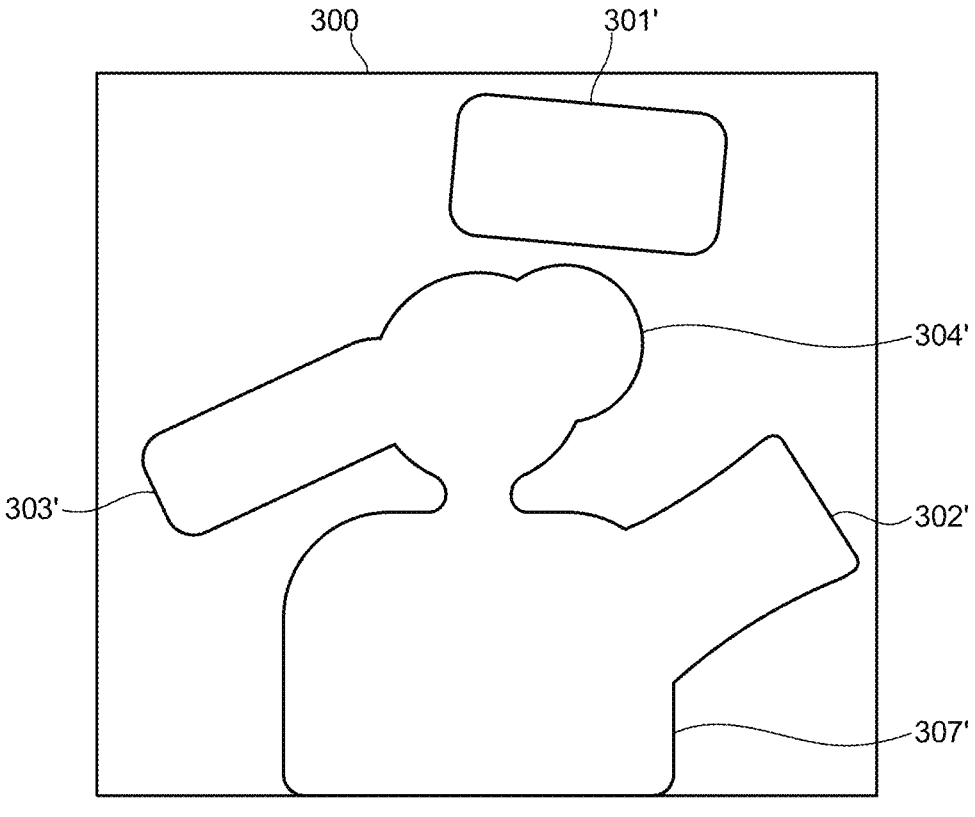
FIG. 5 is a diagram for explaining recognition of a shadow region in the captured image illustrated in FIG. 3 and calculation of shadow intensiveness degree.

FIG. 5 is a diagram for explaining recognition of a shadow region in captured image 300 illustrated in FIG. 3 and calculation of the shadow intensiveness degree.

Region recognizer 211 calculates a difference in luminance between the captured image (background image) before the products are placed and the captured image after the products are placed, and detects shadow region 307' and product regions 301' to 304' (and product region 305' in some cases). Then, region recognizer 211 recognizes shadow region 307' by excluding, from detected shadow region 307' and product regions 301' to 304', product regions 301' to 304' recognized by the above-described product detection.

Shadow intensiveness degree calculator 213 calculates, as the shadow intensiveness degree of shadow region 307', the average value of absolute values of difference values for respective pixels between shadow region 307' in the captured image and the background image. Then, shadow intensiveness degree calculator 213 refers to the shadow-light intensiveness degree correspondence relation data stored in shadow-light intensiveness degree correspondence relation storage 214, and determines the intensity of the light to be emitted by illuminating projector 201 in accordance with the shape of shadow region 307'.

Figure 6:
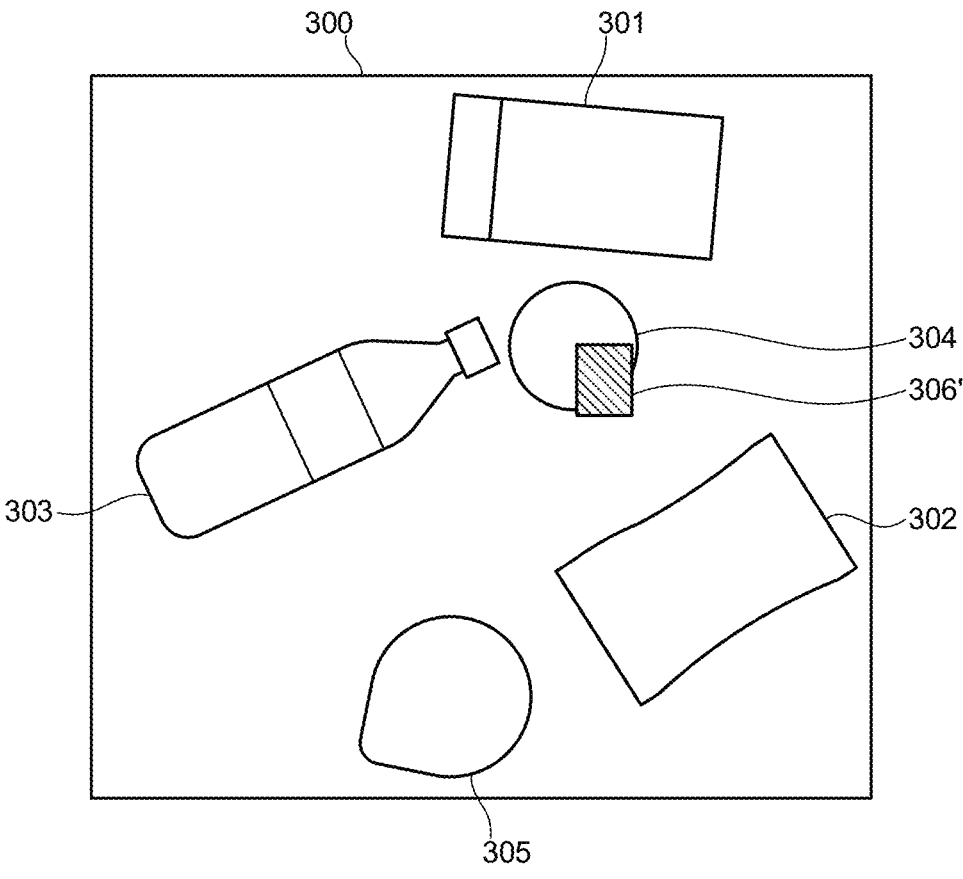
FIG. 6 is a diagram for explaining recognition of a blown-out highlight region in the captured image illustrated in FIG. 3.

FIG. 6 is a diagram for explaining recognition of a blown-out highlight region in captured image 300 illustrated in FIG. 3.

Blown-out highlight detector 215 recognizes blown-out highlight region 306' in captured image 300 based on the blown-out highlight detection model stored in blown-out highlight detection model storage 216. The blown-out highlight region is recognized as a rectangular region, as illustrated in the figure. This is because learner 207 uses an image of a rectangular region as training data when the blown-out highlight detection model is trained. In a case where the blown-out highlight detection model is trained by using an image with another shape such as a circle as training data, the blown-out highlight region is recognized as a region corresponding to the shape. When recognizing blown-out highlight region 306', blown-out highlight detector 215 determines not to emit light in the shape of blown-out highlight region 306' (determines the intensity of grade 0 described above).

<Operation of Product Recognition System>

Next, the operation of product recognition system 10 will be described.

Figure 7:
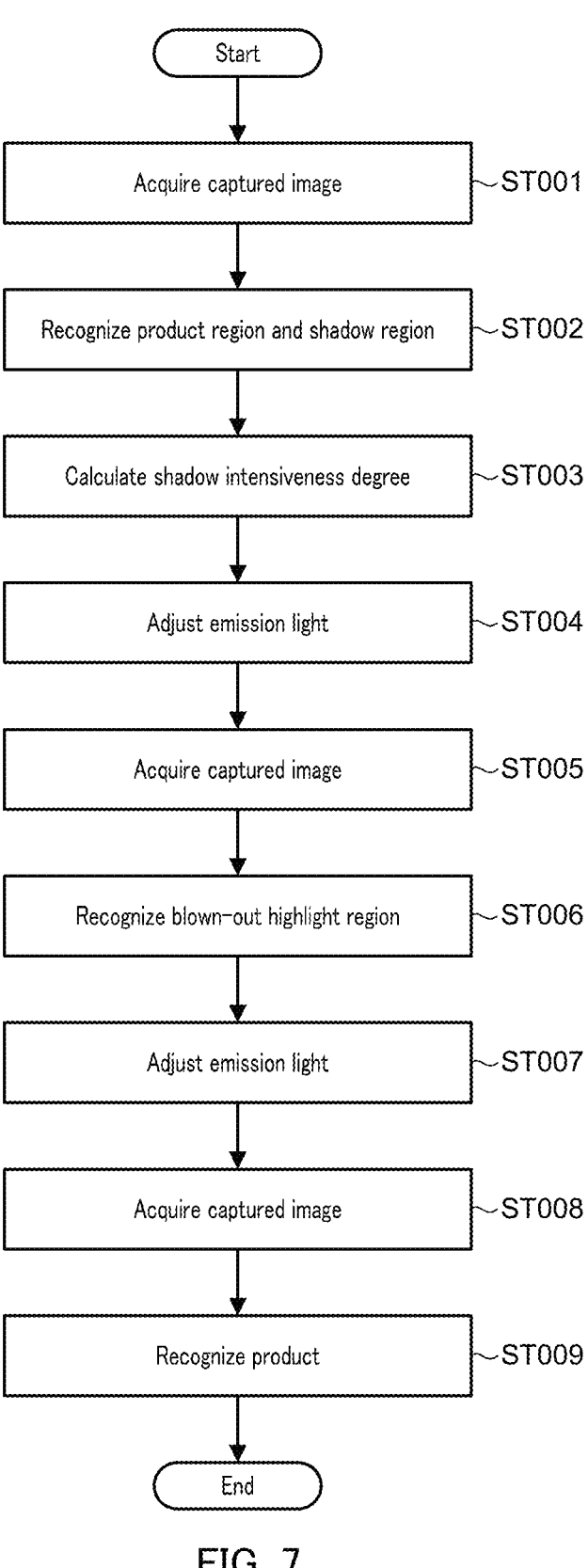
FIG. 7 is a flowchart illustrating an example of an operation of the product recognition system according to Embodiment 1 of the present disclosure.

FIG. 7 is a flowchart illustrating an example of an operation of product recognition system 10 according to Embodiment 1. The operation illustrated in FIG. 7 may include the illumination adjustment method according to the present disclosure, and may be executed at a timing at which the product recognition is to be executed during checkout for products by the user. The operation illustrated in FIG. 7 may be executed, for example, at a timing when the user presses a checkout button displayed on display apparatus 104 that is a touch panel.

In step ST001, image acquirer 202 captures an image of the placement surface of product placement site 105 on which a product is placed, and acquires a captured image. In step ST001, for example, illuminating projector 201 emits above-described grade-1 default emission light to the placement surface of product placement site 105.

In step ST002, region recognizer 211 recognizes the product region and the shadow region in the captured image acquired in step ST001.

In step ST003, shadow intensiveness degree calculator 213 calculates the shadow intensiveness degree of the shadow region recognized in step ST002.

In step ST004, based on the shadow intensiveness degree calculated in step ST003, shadow intensiveness degree calculator 213 determines the intensity of the light to be emitted by illuminating projector 201 in accordance with the shape of the shadow region recognized in step ST002. That is, shadow intensiveness degree calculator 213 performs adjustment such that illuminating projector 201 emits light with the intensity determined in accordance with the shape of the shadow region recognized in step ST002.

In step ST005, image acquirer 202 captures an image of the placement surface of product placement site 105 on which the product is placed, and acquires a captured image. In step ST005, illuminating projector 201 emits light with the intensity determined in step ST004 in accordance with the shape of the shadow region, and emits light with the intensity emitted in step ST001 to the region other than the shadow region.

In step ST006, blown-out highlight detector 215 recognizes the blown-out highlight region in the captured image acquired in step ST005.

In step ST007, blown-out highlight detector 215 determines, as above-described grade 0 (set to off "0"), the intensity of the light emitted by illuminating projector 201 in accordance with the shape of the blown-out highlight region recognized in step ST006.

In step ST008, image acquirer 202 captures an image of the placement surface of product placement site 105 on which the product is placed, so as to acquire a captured image. In step ST008, illuminating projector 201 emits light with the intensity determined in step ST004 in accordance with the shape of the shadow region, does not emit light to the blown-out highlight region, and emits, to the region other than the shadow region and the blown-out highlight region, light with the intensity emitted in step ST001.

In step ST009, product recognizer 205 recognizes the product in the captured image acquired in step ST008.

When the shadow region is not recognized in step ST002, steps ST003 to ST005 are not executed, and the captured image acquired in the step S001 is used in step ST006 for detecting the blown-out highlight.

When no blown-out highlight region is recognized in step ST006, steps ST007 and ST008 are not executed.

When the shadow region is not recognized in step ST002 and the blown-out highlight region is not recognized in step ST006, product recognizer 205 recognizes, in step ST009, the product in the captured image acquired in step ST001 instead of the captured image acquired in step ST008.

When the shadow region is recognized in step ST002 and the blown-out highlight region is not recognized in step ST006, product recognizer 205 recognizes, in step ST009, the product in the captured image acquired in step ST005 instead of the captured image acquired in step ST008.

Figure 8:
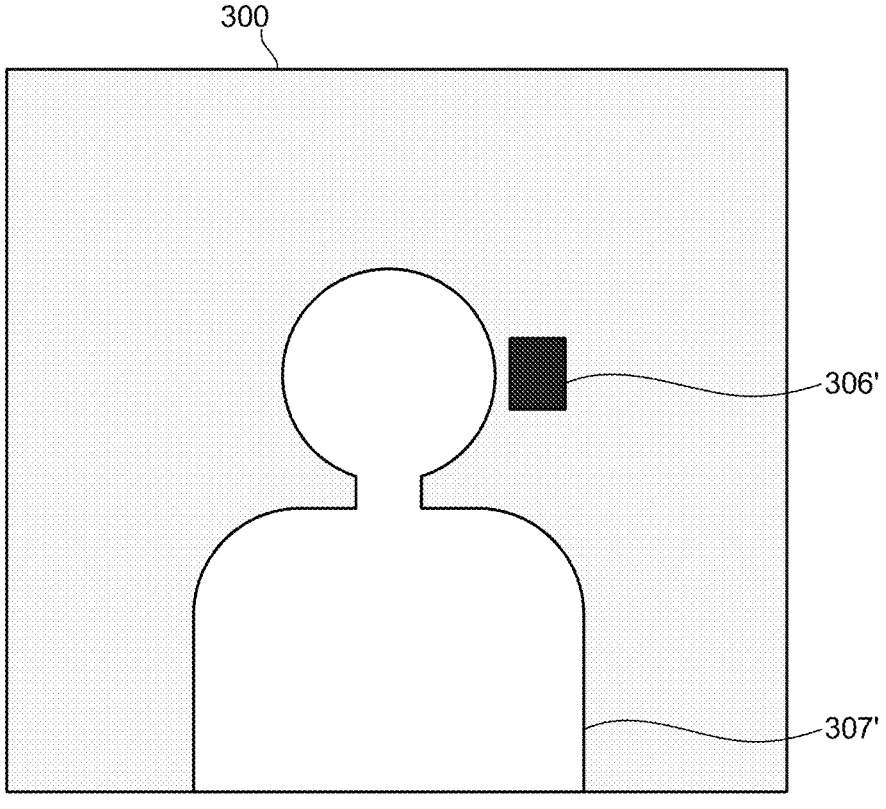
FIG. 8 is a diagram for explaining output contents (brightness of the placement surface) of an illuminating projector using the captured image illustrated in FIG. 3 after emission light adjustment.

FIG. 8 is a diagram for explaining, using captured image 300 illustrated in FIG. 3, output contents (brightness of the placement surface) of illuminating projector 201 after the emission light adjustment in steps ST004 and ST007 of FIG. 7.

For example, the light with the intensity of above-described grade 1 is emitted to the region other than blown-out highlight region 306' and shadow region 307' in captured image 300, and this region is illustrated in gray for convenience. Meanwhile, light is not emitted to blown-out highlight region 306' in captured image 300 in accordance with, for example, the intensity of above-described grade 0, and blown-out highlight region 306' is illustrated in black that is darker than gray for convenience. In addition, for example, the light with the intensity of above-described grade 2 is emitted to shadow region 307' in captured image 300, and shadow region 307' is illustrated in white that is brighter than gray for convenience.

Figure 9:
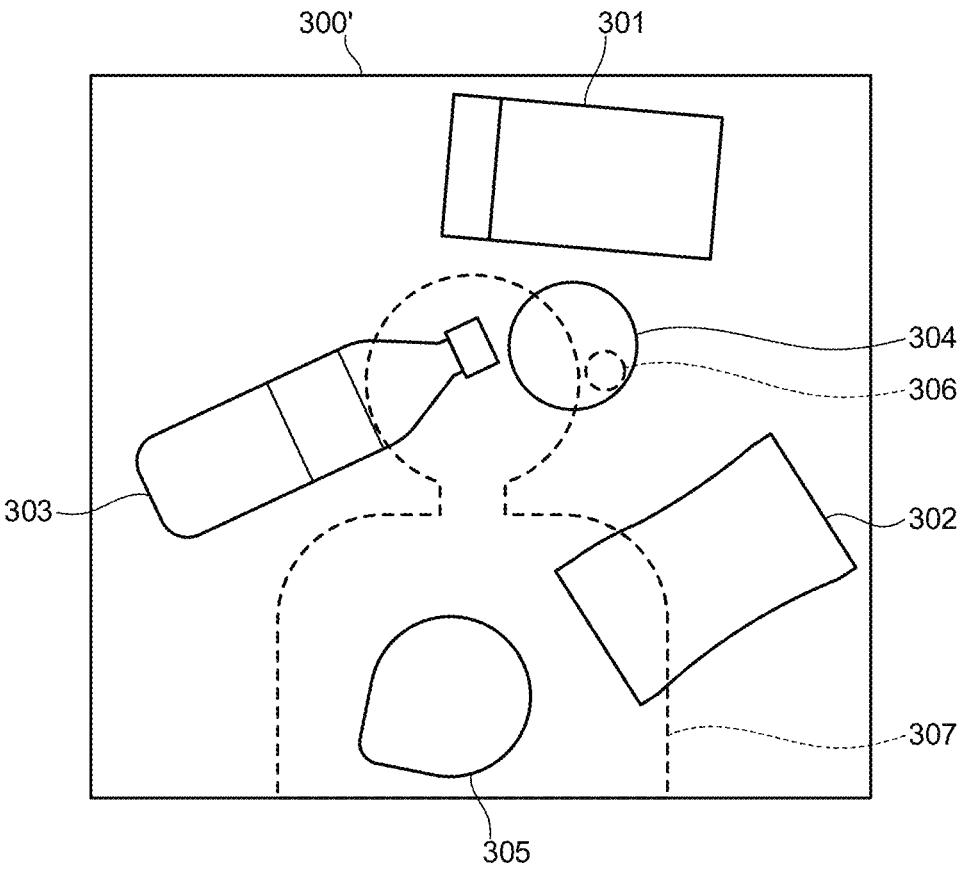
FIG. 9 is a diagram illustrating an example of the captured image re-acquired by capturing an image of the objects (products) placed on the placement surface of the product placement site after the emission light adjustment.

FIG. 9 is a diagram illustrating exemplary captured image 300' re-acquired by capturing an image of objects (products) placed on the placement surface of product placement site 105 in step ST009 of FIG. 7 after the emission light adjustment in step ST004 and ST007 of FIG. 7.

In captured image 300', formerly existed blown-out highlight 306 is suppressed as compared to captured image 300, while formerly existed shadow 307 is brighter than in captured image 300.

Effects of Embodiment 1

As described above, the illumination adjustment apparatus according to Embodiment 1 of the present disclosure includes the recognizer that recognizes an abnormal region in a captured image, and the adjuster that adjusts the intensity of the illuminating light in accordance with the shape and type of the abnormal region. With this configuration, it is possible to reduce the influence of the abnormal region on the product recognition accuracy by emitting the illuminating light while performing illumination adjustment, for example, for brightening a shadow region that is a type of the abnormal region and illumination adjustment, for example, for darkening a blown-out highlight region that is a type of the abnormal region, by using, for example, a projector as the illuminator that emits the illuminating light. As a result, it is possible to generate a precise captured image whose abnormal region can be coped with, and it is possible to stabilize the product recognition accuracy. Further, improvement in usability such as a decrease in erroneous checkout can be achieved. In addition, adjustment of an illumination environment at the time of installation of product recognition system 10 becomes unnecessary.

<Variations>

Embodiment 1 has been described in relation to an example in which illuminating projector 201 emits light in accordance with the distance to the placement surface of product placement site 105, but the present disclosure is not limited to this example. For example, the height of a high product may be estimated by using a three-dimensional camera as image-capturing apparatus 102 (illuminating projector 201) or by additionally using a distance sensor, and the shape of the emission light may be three-dimensionally corrected for such a product. Particulars are as follows.

When the product has a certain level of height, the distance between the top surface of the product and illumination apparatus 101 becomes close, and therefore an image of a part corresponding to a shadow region irradiated with the adjusted emission light or a blown-out highlight region not irradiated with the emission light may become smaller than predicted.

To avoid this, the three-dimensional camera or the distance sensor measures the distance between the top surface of the product and illumination apparatus 101, and outputs the measured distance to illumination adjuster 204 (more specifically, one or both of shadow intensiveness degree calculator 213 and blown-out highlight detector 215). Then, illumination adjuster 204 may correct the illuminating light by using the measured distance so that the shadow region/blown-out highlight region is accurately covered by the illuminating light at the height of the top surface of each product. When the height information on the product is present, the position and size of the product in the three-dimensional coordinate system can be grasped. Thus, also for a high product, illumination adjuster 204 can accurately correct the emission position (range) of the emission light after the emission light adjustment in steps ST004 and ST007 of FIG. 7. In the case where the height information on the product is used, and when the height of the product is equal to or greater than a predetermined threshold, illumination adjuster 204 may correct the emission light as described above.

On the other hand, when there is no extremely high product, illumination adjuster 204 can deal with the shadow region/the blown-out highlight region for most products by setting a larger brightened region (when the shadow region is recognized)/a larger darkened region (when the blown-out highlight region is recognized).

Embodiment 1 has been described in relation to an example in which shadow intensiveness degree calculator 213 calculates, as the shadow intensiveness degree of the shadow region, the average value of the absolute values of the pixel-based difference values between the shadow region and the background image, but the present disclosure is not limited to this example.

For example, when the shadow region is larger than a predetermined block, shadow intensiveness degree calculator 213 may divide the shadow region into predetermined smaller blocks and calculate an average value of absolute values of pixel-based difference values for each divided block. Then, shadow intensiveness degree calculator 213 may determine the intensity of light for each divided block. The shape of the block is rectangular by way of example, but may be another shape such as a triangle.

In addition, when there are a plurality of shadow regions separated from one another, shadow intensiveness degree calculator 213 may calculate the shadow intensiveness degree for each shadow region and determine the intensity of light for each shadow region. Here, a plurality of shadow regions separated from one another are generated, for example, when a plurality of persons stand in front of a checkout table at the same time or an object other than a person exists in the vicinity of the checkout table. Also in this case, when each of the shadow regions is larger than a predetermined block, the shadow intensiveness degree may be calculated for each of the further divided blocks to determine the light intensity.

In addition, when there is unevenness in the shadow intensiveness degree of the shadow region, shadow intensiveness degree calculator 213 may change the intensity of the light in accordance with the unevenness.

Similarly, in a case where there is unevenness in the blown-out highlight region, blown-out highlight detector 215 may change the intensity of the light in accordance with the unevenness. In this case, for example, one or more grades may be set between grade 0 and grade 1 described above.

Embodiment 1 has been described in relation to an example in which illumination adjuster 204 deals with both the shadow region and the blown-out highlight region, but the present disclosure is not limited to this example.

For example, illumination adjuster 204 may deal with only one of the shadow region and the blown-out highlight region. That is, blown-out highlight detector 215 and blown-out highlight detection model storage 216 do not have to be present, and only region recognizer 211, product detection model storage 212, shadow intensiveness degree calculator 213, and shadow-light intensiveness degree correspondence relation storage 214 may be present. Alternatively, region recognizer 211, product detection model storage 212, shadow intensiveness degree calculator 213, and shadow-light intensiveness degree correspondence relation storage 214 do not have to be present, and only blown-out highlight detector 215 and blown-out highlight detection model storage 216 may be present.

Embodiment 1 has been described in relation to an example in which, when at least one of the shadow region and the blown-out highlight region is recognized, the at least one of the shadow region and the blown-out highlight region is dealt with. However, for example, when at least one of the shadow region and the blown-out highlight region is sufficiently small (for example, when its area is less than a predetermined area), illumination adjuster 204 does not have to recognize it as the at least one of the shadow region and the blown-out highlight region and does not have to deal with it. In other words, when at least one of the shadow region and the blown-out highlight region is equal to or larger than a predetermined area, illumination adjuster 204 may recognize the at least one of the shadow region and the blown-out highlight region and cope with the at least one of the shadow region and the blown-out highlight region as described above. This is because when at least one of the shadow region and the blown-out highlight region is sufficiently small, the influence on the product recognition accuracy is considered to be small.

Embodiment 1 has been described in relation to an example of adjustment on the intensity of light, but the color of light may be further adjusted. For example, in a case where a light source of a special color is disposed around a placement table, such a color may be mixed with an original color of a product, and the product may appear to have a different color, resulting in a decrease in recognition accuracy. In such a case, illumination adjuster 204 instructs the illumination apparatus that is a projector to emit light of a color which cancels such a special color, thereby improving the recognition accuracy. The color which can affect the recognition accuracy can be specified, for example, from a difference between the color of the placement table in an ideal environment (white, for example) recorded in advance and the color of the placement table in the captured image. In addition, a color which cancels the product color can be determined by calculating a color which produces white when combined with a color which may affect the recognition accuracy.

In Embodiment 1, a simple color material is used as one example of the color of the placement table of product placement site 105, but the color or pattern of the placement surface may be variable. Such a placement surface can be realized by, for example, configuring the placement surface with a liquid crystal display or the like, or configuring it as a screen by projecting the placement surface from behind the placement surface with another projector or the like. In this case, product recognition system 10 can acquire an image corresponding to the placement surface before the product is placed, by acquiring data of the image employed as the placement surface. By using this color or pattern as the background image, the illuminating light can be adjusted in accordance with the abnormal region as in Embodiment 1.

In Embodiment 1, product recognition system 10 firstly emits illuminating light with a default intensity. However, in a case where the placement table of product placement site 105 is detected to be sufficiently bright by a separately installed illuminance sensor or the like, this processing may be omitted. In this case, since a control of making the illuminating light darker than in the current state cannot be performed, the processing related to the blown-out highlight region may be omitted.

In Embodiment 1, it is determined that the intensity of the light is set to grade 0 (off) for the blown-out highlight region, but when there are a plurality of grades between the default and grade 0, light that is less intense than the default but more intense than grade 0 (off) may be employed. In a case where the blown-out highlight region and the shadow region are mixed, a control of preventing the shadow region from becoming too dark can be performed for grade 0 (off). In addition, it may be determined whether the intensity of the light is set to grade 0 (off) or a higher intensity in accordance with the ratio of the shadow region included in the blown-out highlight region or the like. Since the presence or absence of occurrence of the blown-out highlight is influenced by the reflectance and the material of a subject, the blown-out highlight can occur in the region where the light of the default intensity causes the blown-out highlight, unless the light is turned off (however, when the light is weak, the area of the blown-out highlight may become small). Therefore, when the main purpose can be elimination of the blown-out highlight (for example, when the shadow region is not included in the blown-out highlight region or the ratio of the shadow region is small), it is useful to set the intensity of the light for the blown-out highlight region to grade 0 (off) regardless of the number of grades between the default light intensity and grade 0.

In Embodiment 1, the background image may be an image of a placement table captured in advance in an ideal environment. The shadow generated on the placement table includes a temporary shadow such as a shadow of a person and a permanent shadow caused by a surrounding object (a shelf, a column, or the like). Therefore, when the captured image before the product is placed is used as the background image, it is possible to acquire the background image without the temporary shadow; but it is not possible to eliminate the permanent shadow: Therefore, in the method for specifying the shadow region using a difference from the background image, a part corresponding to the permanent shadow may not be detected as the shadow region. On the other hand, when the image of the placement table captured in advance in the ideal environment is used as the background image, an image without any permanent shadow can be used as the background image. Thus, a shadow region which includes the permanent shadow can be recognized and dealt with.

Embodiment 1 has been described in relation to an example of the adjustment of the light emitted by the illumination apparatus, which is a projector, with respect to the shadow region and the blown-out highlight region, but the present disclosure is not limited to this example.

For example, the shadow region and the blown-out highlight region may be dealt with not by the projector but by light control of a monochromatic illumination apparatus. In this case, since the projector is unnecessary, implementation at low cost is possible. In this case, the illumination apparatus may perform a light control such that illumination is made brighter as the shadow is darker (the shadow intensiveness degree is higher), or a light control such that illumination is made darker as the blown-out highlight is broader.

In the description of the embodiment described above, the term, such as "part" or "portion" or the term ending with a suffix, such as "-er" "-or" or "-ar" may be replaced with another term, such as "circuit (circuitry)," "device," "unit," or "module."

Although the embodiments have been described above with reference to the drawings, the present disclosure is not limited to these examples. Obviously, a person skilled in the art would arrive at variations and modifications within a scope described in claims. It is understood that these variations and modifications are within the technical scope of the present disclosure. Moreover, any combination of features of the above-mentioned embodiments may be made without departing from the spirit of the disclosure.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The disclosure of Japanese Patent Application No. 2021-086135, filed on May 21, 2021, including the specification, drawings and abstract, is incorporated herein by reference in its entirety.

One exemplary embodiment of the present disclosure is useful as a product recognition apparatus.

REFERENCE SIGNS LIST

10 Product recognition system
101 Illumination apparatus
102 Image-capturing apparatus
103 Information processing apparatus
104 Display apparatus
105 Product placement site
106 Product
111 Control apparatus
112 Storage apparatus
113 Communication apparatus
201 Illuminating projector
202 Image acquirer
203 Image storage
204 Illumination adjuster
205 Product recognizer
206 Product recognition model storage 207 Learner
211 Region recognizer
212 Product detection model storage
213 Shadow intensiveness degree calculator
214 Shadow-light intensiveness degree correspondence relation storage
215 Blown-out highlight detector
216 Blown-out highlight detection model storage
300 Captured image
301 to 305 Product
306 Blown-out highlight
307 Shadow
301' to 305' Product region
306' Blown-out highlight region
307' Shadow region
300' Captured image

The invention claimed is:

1. An illumination adjustment apparatus, comprising:
a controller, including at least a processor and a memory, configured to:
recognize a product region of a product from a captured image, and a shadow region in the captured image by excluding the recognized product region from a difference between the captured image and a background image; and
adjust, in a state in which the shadow region is recognized, an intensity of illuminating light such that the intensity of the illuminating light is higher than an intensity of illuminating light emitted to acquire the captured image.

2. The illumination adjustment apparatus according to claim 1, wherein
the controller is further configured to recognize the product region of the product based on a product detection model for detecting the product and based on edge detection.

3. The illumination adjustment apparatus according to claim 1, wherein
in a state in which the shadow region is recognized, the controller is further configured to calculate a shadow intensiveness degree of the shadow region, and the intensity of the illuminating light based on the shadow intensiveness degree of the shadow region.

4. The illumination adjustment apparatus according to claim 1, wherein
the controller is further configured to:
recognize an abnormal region including at least one of the shadow region and a blown-out highlight region; and
adjust the intensity of illuminating light in accordance with a shape and a type of the abnormal region.

5. The illumination adjustment apparatus according to claim 4, wherein:
in a state in which the blown-out highlight region is recognized, the controller is further configured to adjust the intensity of the illuminating light such that the intensity of the illuminating light is lower than the intensity of the illuminating light emitted to acquire the captured image.

6. The illumination adjustment apparatus according to claim 5, wherein
in a state in which the shadow region and the blown-out highlight region are recognized, the controller is further configured to adjust the intensity of the illuminating light such that the intensity of the illuminating light is lower than the intensity of the illuminating light emitted to acquire the captured image, after adjusting the intensity of the illuminating light such that the intensity of the illuminating light is higher than the intensity of the illuminating light emitted to acquire the captured image.

7. The illumination adjustment apparatus according to claim 4, wherein the controller is further configured to recognize the abnormal region in a state in which the abnormal region is equal to or larger than a predetermined area.

8. The illumination adjustment apparatus according to claim 4, wherein based on a height of a product, the controller is further configured to correct an emission range of the illuminating light to be emitted at the intensity in accordance with the shape and type of the abnormal region.

9. An illumination adjustment method, comprising:

recognizing a product region of a product from a captured image, and a shadow region in the captured image by excluding the recognized product region from a difference between the captured image and a background image; and adjusting, in a state in which the shadow region is recognized, an intensity of illuminating light such that the intensity of the illuminating light is higher than an intensity of illuminating light emitted to acquire the captured image.

10. A product recognition system, comprising:

an illuminator that emits illuminating light to a predetermined region on which a product is placed;

a camera that captures and acquires an image of the predetermined region to which the illuminating light is emitted; and an illumination adjustment apparatus that:

recognizes a product region of a product from a captured image, and a shadow region in the captured and acquired image by excluding the recognized product region from a difference between the captured image and a background image, and adjusts, in a state in which the shadow region is recognized, an intensity of the illuminating light such that the intensity of the illuminating light is higher than an intensity of illuminating light emitted to acquire the captured image, wherein the camera re-captures and re-acquires the image of the predetermined region to which the illuminator emits or does not emit the illuminating light at the intensity adjusted, and the illumination adjustment apparatus recognizes the product in the re-captured and re-acquired image.

11. The product recognition system according to claim 10, wherein the illumination adjustment apparatus further recognizes an abnormal region including at least one of a shadow region and a blown-out highlight region, and adjusts the intensity of illuminating light in accordance with a shape and a type of the abnormal region, and an emission range of the illuminating light to be emitted at the intensity in accordance with the shape and type of the abnormal region is corrected based on a height of a product.

* * * * *